US012555264B2

(12) United States Patent
Balachandran et al.

(10) Patent No.: US 12,555,264 B2
(45) Date of Patent: Feb. 17, 2026

(54) OBJECT DETECTION USING IMAGE AND AUDIO DATA

(71) Applicant: QUALCOMM Incorporated, San Diego, CA (US)

(72) Inventors: Balaji Shankar Balachandran, San Diego, CA (US); Varun Ravi Kumar, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 18/339,559

(22) Filed: Jun. 22, 2023

(65) Prior Publication Data

US 2024/0428441 A1    Dec. 26, 2024

(51) Int. Cl.
*G06T 7/73* (2017.01)
*G06T 7/55* (2017.01)

(52) U.S. Cl.
CPC ............... *G06T 7/73* (2017.01); *G06T 7/55* (2017.01); *G06T 2207/10028* (2013.01)

(58) Field of Classification Search
CPC ... G06T 7/73; G06T 7/55; G06T 2207/10028; G06F 2218/12; G06F 2218/22; G06V 10/803; G06V 10/806; G06V 10/82; G06V 20/64; G06V 20/52; G06V 20/56
USPC ......................................................... 382/103
See application file for complete search history.

(56) References Cited

FOREIGN PATENT DOCUMENTS

| JP | 2014178966 | * | 9/2014 |
| JP | 2016193144 | * | 11/2016 |
| WO | 2022203168 A1 | | 9/2022 |

OTHER PUBLICATIONS

Adavanne S., et al., "Sound Event Localization and Detection of Overlapping Sources Using Convolutional Recurrent Neural Networks", Arxiv.Org, Cornell University Library, 201 Olin Library Cornell University Ithaca, NY 14853, arXiv:1807.00129v1 [cs.SD], Jun. 30, 2018, XP081109659, pp. 1-13, Sections II and III, Figure 1.
Cheng S., et al., "Audio-Visual Salient Object Detection", Aug. 9, 2021, Aug. 9, 2021, XP047604804, pp. 510-521, Section 3, Figure 1.
International Search Report and Written Opinion—PCT/US2024/026812—ISA/EPO—Jul. 23, 2024.

(Continued)

*Primary Examiner* — Jerome Grant, II
(74) *Attorney, Agent, or Firm* — QUALCOMM Incorporated (57) ABSTRACT

In some aspects, a device may obtain, via a camera associated with the device, an image that includes one or more objects located within an area of the device. The device may generate a first three-dimensional output based at least in part on the image. The device may obtain, via an audio component associated with the device, an audio input associated with the one or more objects. The device may generate a second three-dimensional output based at least in part on the audio input. The device may detect the one or more objects based at least in part on the first three-dimensional output and the second three-dimensional output. Numerous other aspects are described.

28 Claims, 6 Drawing Sheets

(56) References Cited

OTHER PUBLICATIONS

Li X., et al., "Panoramic Video Salient Object Detection with Ambisonic Audio Guidance", Arxiv.Org, Cornell University Library, 201 Olin Library Cornell University Ithaca, NY 14853, arXiv:2211.14419v1 [cs.CV], Nov. 26, 2022, XP091379099, 9 Pages, p. 2-p. 7, Figures 1-7.

Li Y., et al., "Multi-Modal Perception Attention Network with Self-Supervised Learning for Audio-Visual Speaker Tracking", Arxiv.Org, Cornell University Library, 201 Olin Library Cornell University Ithaca, NY 14853, arXiv:2112.07423v1 [cs.CV], Dec. 14, 2021, XP091120729, 8 Pages, p. 3-p. 7, Figure 2.

802 11 Working Group of the LAN/MAN Standards Committee of the IEEE Computer Society: "Draft Standard for Information Technology-Tele-Communications and Information Exchange Between Systems Local and Metropolitan Area Networks-Specific Requirements, Part 11: Wireless LAN Medium Access Control and Physical Layer Specification, Amendment 8: Enhancements For Extremely High Throughput", Jan. 31, 2023, XP068196253, vol. 802.11be drafts, No. D3.0, pp. 1-999, par[9.3.1.22]-[9.3.1.22.5], par[9.3.1.22.9], par[9.3.3]-[9.3.3.10], par[35.3.17].

IEEE SA: "IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment 4: Enhancements for Positioning", IEEE Standard, IEEE, Piscataway, NJ, USA, Mar. 3, 2023, XP068200271, 248 Pages, paragraph [9.4.2.36], paragraph [9.4.2.297], paragraphs [11.21]—[11.21.6.4.3.2], paragraph [11.21.6.4.8.2].

International Search Report and Written Opinion—PCT/US2024/014803—ISA/EPO—May 21, 2024.

* cited by examiner

OBJECT DETECTION USING IMAGE AND AUDIO DATA

FIELD OF THE DISCLOSURE

Aspects of the present disclosure generally relate to object detection and, for example, to three-dimensional object detection using image and audio data.

BACKGROUND

Object detection, such as three-dimensional object detection, may be used to detect one or more objects in an environment. An object detection system may include one or more cameras for capturing image data associated with the one or more objects. In one example, the object detection system may be associated with a vehicle, such as an automobile. The vehicle may include one or more cameras, such as back-up cameras and side-view cameras, for capturing images associated with other vehicles, pedestrians, cyclists, and traffic signs, among other examples, within an area of the vehicle. The object detection system may use image analysis and object recognition to identify and/or track the one or more objects to improve a safety of the vehicle, for example, by providing crucial data for collision avoidance systems, lane departure warnings, automatic emergency braking, and other vehicle safety features.

SUMMARY

Some aspects described herein relate to a method of wireless communication performed by a device. The method may include obtaining, via a camera associated with the device, an image that includes one or more objects located within an area of the device. The method may include generating a first three-dimensional output based at least in part on the image. The method may include obtaining, via an audio component associated with the device, an audio input associated with the one or more objects. The method may include generating a second three-dimensional output based at least in part on the audio input. The method may include detecting the one or more objects based at least in part on the first three-dimensional output and the second three-dimensional output.

Some aspects described herein relate to a device for wireless communication. The device may include one or more memories and one or more processors coupled to the one or more memories. The one or more processors may be configured to obtain, via a camera associated with the device, an image that includes one or more objects located within an area of the device. The one or more processors may be configured to generate a first three-dimensional output based at least in part on the image. The one or more processors may be configured to obtain, via an audio component associated with the device, an audio input associated with the one or more objects. The one or more processors may be configured to generate a second three-dimensional output based at least in part on the audio input. The one or more processors may be configured to detect the one or more objects based at least in part on the first three-dimensional output and the second three-dimensional output.

Some aspects described herein relate to a non-transitory computer-readable medium that stores a set of instructions for wireless communication by a device. The set of instructions, when executed by one or more processors of the device, may cause the device to obtain, via a camera associated with the device, an image that includes one or more objects located within an area of the device. The set of instructions, when executed by one or more processors of the device, may cause the device to generate a first three-dimensional output based at least in part on the image. The set of instructions, when executed by one or more processors of the device, may cause the device to obtain, via an audio component associated with the device, an audio input associated with the one or more objects. The set of instructions, when executed by one or more processors of the device, may cause the device to generate a second three-dimensional output based at least in part on the audio input. The set of instructions, when executed by one or more processors of the device, may cause the device to detect the one or more objects based at least in part on the first three-dimensional output and the second three-dimensional output.

Some aspects described herein relate to an apparatus for wireless communication. The apparatus may include means for obtaining, via a camera associated with the apparatus, an image that includes one or more objects located within an area of the apparatus. The apparatus may include means for generating a first three-dimensional output based at least in part on the image. The apparatus may include means for obtaining, via an audio component associated with the apparatus, an audio input associated with the one or more objects. The apparatus may include means for generating a second three-dimensional output based at least in part on the audio input. The apparatus may include means for detecting the one or more objects based at least in part on the first three-dimensional output and the second three-dimensional output.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Three-dimensional (3D) object detection may be used to detect objects within a three-dimensional space. An object detection system configured to perform three-dimensional object detection may include one or more cameras for capturing image data associated with the objects in the three-dimensional space. In one example, the object detection system may be included within a vehicle, such as an automobile, and may be used to detect one or more objects, such as other vehicles, pedestrians, cyclists, and traffic signs, within an area of the vehicle. The object detection system included within the vehicle may use the one or more cameras for capturing image data associated with the one or more objects, and use the image data for improving a safety of the vehicle.

In some cases, audio signals may be used for two-dimensional object detection. For example, an audio component, such as a microphone, may detect an audio signal, such as a musical instrument, and may identify the musical instrument in a two-dimensional image. However, object detection systems may not be configured to use audio data for three-dimensional object detection. In particular, object detection systems may not be configured to use a combination of image data and audio data for three-dimensional object detection. Additionally, camera-based object detection systems may not be configured to use audio data to improve or train the object detection system. This may result in the object detection system failing to detect certain objects. In the vehicle example described above, a camera-based object detection system may use a camera to detect a pedestrian and a cyclist that are within a driving path of the vehicle. Another vehicle, such as a truck, may be approaching the vehicle from a location that is not detectable by the camera. For example, the truck may be approaching from behind a tree, a building, or a divider wall. The camera-based object detection system may not be configured to detect sounds being made by the truck, and therefore, may not be able to detect that the truck is approaching from the occluded location. This may reduce the efficacy and safety of the object detection system, particularly in crowded environments and environments having uneven terrain.

Various aspects generally relate to object detection. Some aspects more specifically relate to three-dimensional object detection using image and audio data. In some examples, a device, using a camera associated with the device, may obtain an image that includes one or more objects located within an area of the device, and may generate a first three-dimensional output based at least in part on the image. Additionally, the device, using an audio component associated with the device, may obtain an audio input associated with the one or more objects, and may generate a second three-dimensional output based at least in part on the audio input. In some examples, the device may generate a coordinate map that includes a plurality of coordinates, where each coordinate of the plurality of coordinates corresponds to an object of the one or more objects The plurality of coordinates may include a first type of coordinate that corresponds to an object that is detected by the camera and the audio component, a second type of coordinate that corresponds to an object that is detected only by the audio component, and a third type of coordinate that corresponds to an object that is detected only by the camera. The device may detect the one or more objects based at least in part on the first three-dimensional output and the second three-dimensional output. For example, the device may correlate the first three-dimensional output and the second three-dimensional output, and may determine one or more locations of the one or more objects and/or one or more distances of the one or more objects from the device based at least in part on correlating the first three-dimensional output and the second three-dimensional output. In some examples, the image data may include a query and the audio data may include at least one of a key or a value, and the device may correlate the image data and the audio data based at least in part on performing a fusion operation using the query, the key, and the value.

Particular aspects of the subject matter described in this disclosure can be implemented to realize one or more of the following potential advantages. In some examples by using image data and audio data for object detection, the described techniques can be used to improve three-dimensional object detection and to increase a likelihood that objects are accurately detected. Additionally, by training the device (and/or the camera associated with the device) using the audio data, the object detection capabilities of the camera may be improved. These examples, among others, are described in more detail below.

Figure 1:
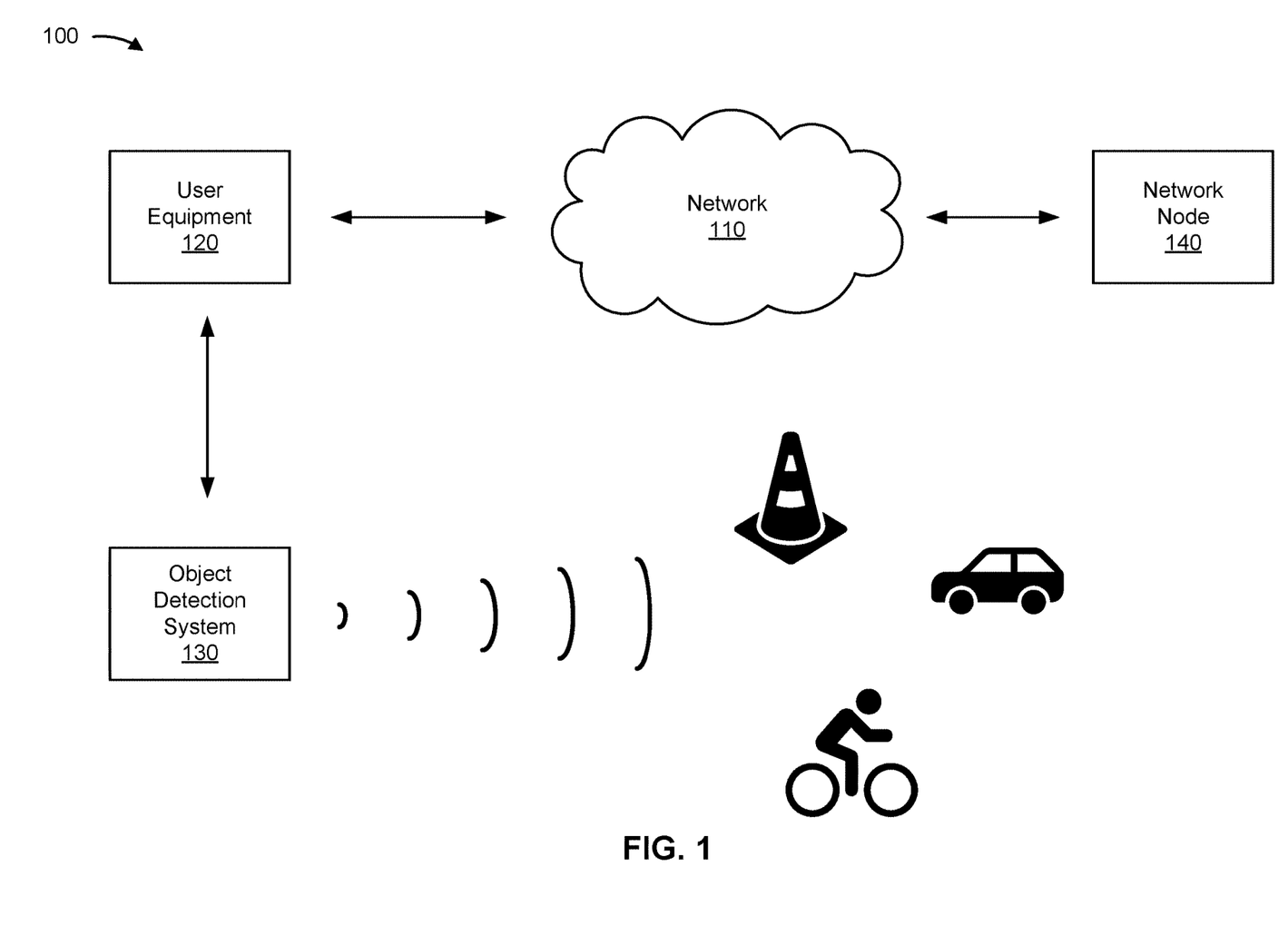
FIG. 1 is a diagram of an example environment in which systems and/or methods described herein may be implemented.

FIG. 1 is a diagram of an example environment 100 in which systems and/or methods described herein may be implemented. As shown in FIG. 1, the environment 100 may include a network 110, a user equipment (UE) 120, an object detection system 130, and a network node 140. In some aspects, the object detection system 130 may be included within the UE 120.

The network 110 may be one or more wired networks, one or more wireless networks, or a combination thereof. A wireless network may be or may include elements of a 3G network, a 4G network, a 5G (New Radio (NR)) network, a Long Term Evolution (LTE) network, and/or a 6G network, among other examples. A network node (e.g., the network node 140) may be a base station (a Node B, a gNB, and/or a 5G node B (NB), among other examples), a UE, a relay device, a network controller, an access point, a transmit receive point (TRP), an apparatus, a device, a computing system, one or more components of any of these, and/or another processing entity configured to perform one or more aspects of the techniques described herein. For example, the network node 140 may be an aggregated base station and/or one or more components of a disaggregated base station.

A UE (e.g., the UE 120) may be stationary or mobile. A UE may also be referred to as an access terminal, a terminal, a mobile station, a subscriber unit, a station, and/or the like. A UE may be, include, or be included in, a vehicle (e.g., an automobile), a component of a vehicle, a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). The UE 120 may be included inside a housing that houses components of the UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

The object detection system 130 may be configured to detect one or more objects in an environment. For example, the object detection system 130 may be configured to detect one or more objects in an area (e.g., within a boundary) of the UE 120. In some aspects, the object detection system 130 may be part of, or may be included in, the UE 120. For example, the UE 120 may be a vehicle and the object detection system 130 may be included within the vehicle. The object detection system 130 may be a three-dimensional object detection system that includes one or more components and/or sensors. For example, the object detection system 130 may include an image component, such as a camera, for capturing image data within the area of the UE 120. Additionally, or alternatively, the object detection system 130 may include an audio component, such as a microphone, for capturing audio data within the area of the UE 120. As described in more detail herein, the object detection system 130 may use the image data and/or the audio data for locating one or more objects in the environment.

The number and arrangement of devices and components shown in FIG. 1 are provided as one or more examples. In practice, there may be additional devices and/or components, fewer devices and/or components, different devices and/or components, or differently arranged devices and/or components than those shown in FIG. 1. Furthermore, two or more devices and/or components shown in FIG. 1 may be implemented within a single device, or a single device and/or component shown in FIG. 1 may be implemented as multiple, distributed devices. Additionally, or alternatively, a set of devices and/or components (e.g., one or more devices and/or components) of environment 100 may perform one or more functions described as being performed by another set of devices and/or components of environment 100.

Figure 2:
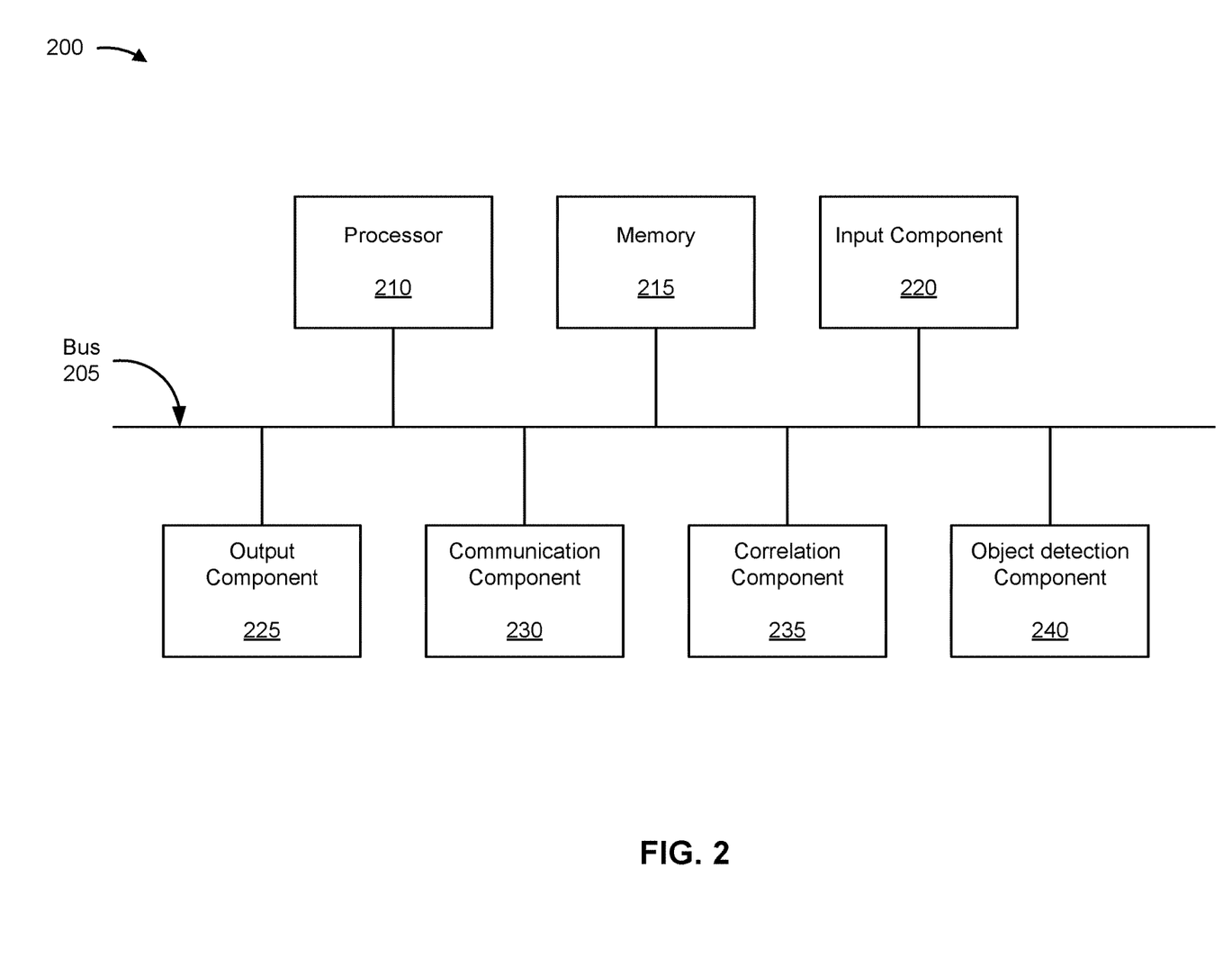
FIG. 2 is a diagram illustrating example components of a device, in accordance with the present disclosure.

FIG. 2 is a diagram illustrating example components of a device 200, in accordance with the present disclosure. The device 200 may correspond to the UE 120. In some aspects, the UE 120 may include one or more devices 200 and/or one or more components of the device 200. As shown in FIG. 2, the device 200 may include a bus 205, a processor 210, a memory 215, an input component 220, an output component 225, a communication component 230, a correlation component 235, and/or an object detection component 240. The object detection component 240 may include one or more features of the object detection system 130 described in connection with FIG. 1.

The bus 205 may include one or more components that enable wired and/or wireless communication among the components of the device 200. The bus 205 may couple together two or more components of FIG. 2, such as via operative coupling, communicative coupling, electronic coupling, and/or electric coupling. For example, the bus 205 may include an electrical connection (e.g., a wire, a trace, and/or a lead) and/or a wireless bus. The processor 210 may include a central processing unit, a graphics processing unit, a microprocessor, a controller, a microcontroller, a digital signal processor, a field-programmable gate array, an application-specific integrated circuit, and/or another type of processing component. The processor 210 may be implemented in hardware, firmware, or a combination of hardware and software. In some aspects, the processor 210 may include one or more processors capable of being programmed to perform one or more operations or processes described elsewhere herein.

The memory 215 may include volatile and/or nonvolatile memory. For example, the memory 215 may include random access memory (RAM), read only memory (ROM), a hard disk drive, and/or another type of memory (e.g., a flash memory, a magnetic memory, and/or an optical memory). The memory 215 may include internal memory (e.g., RAM, ROM, or a hard disk drive) and/or removable memory (e.g., removable via a universal serial bus connection). The memory 215 may be a non-transitory computer-readable medium. The memory 215 may store information, one or more instructions, and/or software (e.g., one or more software applications) related to the operation of the device 200. In some aspects, the memory 215 may include one or more memories that are coupled (e.g., communicatively coupled) to one or more processors (e.g., processor 210), such as via the bus 205. Communicative coupling between a processor 210 and a memory 215 may enable the processor 210 to read and/or process information stored in the memory 215 and/or to store information in the memory 215.

The input component 220 may enable the device 200 to receive input, such as user input and/or sensed input. In some examples, the input component 220 may include an image component, such as a camera, for capturing image data, and/or may include an audio component, such as a microphone, for capturing audio data.

The output component 225 may generate one or more outputs based at least in part on one or more inputs received from the input component 220. In some examples, the output component 225 may generate a first output (e.g., a first three-dimensional output) based at least in part on image data captured by the input component 220, and/or may generate a second output (e.g., a second three-dimensional output) based at least in part on audio data captured by the input component 220.

The communication component 230 may enable the device 200 to communicate with other devices via a wired connection and/or a wireless connection. For example, the communication component 230 may include a receiver, a transmitter, a transceiver, a modem, a network interface card, and/or an antenna.

The correlation component 235 may be configured to correlate data for performing object detection. For example, the correlation component 235 may correlate a first three-dimensional output associated with image data captured by the camera of the UE 120 and a second three-dimensional output associated with audio data captured by the audio component of the UE 120. Correlating two sets of data may include analyzing the data and determining a relationship or association between the two sets of data. For example, correlating the first three-dimensional output and the second three-dimensional output may include determining a difference, a pattern, a trend, and/or a dependency, among other examples, between the first three-dimensional output and the second three-dimensional output.

The object detection component 240 may be configured to detect one or more objects in an environment. The object detection component 240 may detect one or more objects in the area of the UE 120 based at least in part on an input received from the correlation component 235 (e.g., based at least in part on a correlation between the first three-dimensional output associated with the image data and the second three-dimensional output associated with audio data). In some examples, detecting the one or more objects may include determining a location of the one or more objects and/or a distance of the one or more objects from the UE 120.

The device 200 may perform one or more operations or processes described herein. For example, a non-transitory computer-readable medium (e.g., memory 215) may store a set of instructions (e.g., one or more instructions or code) for execution by the processor 210. The processor 210 may execute the set of instructions to perform one or more operations or processes described herein. In some aspects, execution of the set of instructions, by one or more processors 210, causes the one or more processors 210 and/or the device 200 to perform one or more operations or processes described herein. In some aspects, hardwired circuitry may be used instead of or in combination with the instructions to perform one or more operations or processes described herein. Additionally, or alternatively, the processor 210 may be configured to perform one or more operations or processes described herein. Thus, aspects described herein are not limited to any specific combination of hardware circuitry and software.

In some aspects, device 200 may include means for obtaining, via a camera associated with the device, an image that includes one or more objects located within an area of the device; means for generating a first three-dimensional output based at least in part on the image; means for obtaining, via an audio component associated with the device, an audio input associated with the one or more objects; means for generating a second three-dimensional output based at least in part on the audio input; and/or means for detecting the one or more objects based at least in part on the first three-dimensional output and the second three-dimensional output. In some aspects, the means for device 200 to perform processes and/or operations described herein may include one or more components of device 200 described in connection with FIG. 2, such as bus 205, processor 210, memory 215, input component 220, output component 225, communication component 230, a correlation component 235, and/or an object detection component 240.

The number and arrangement of components shown in FIG. 2 are provided as an example. The device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
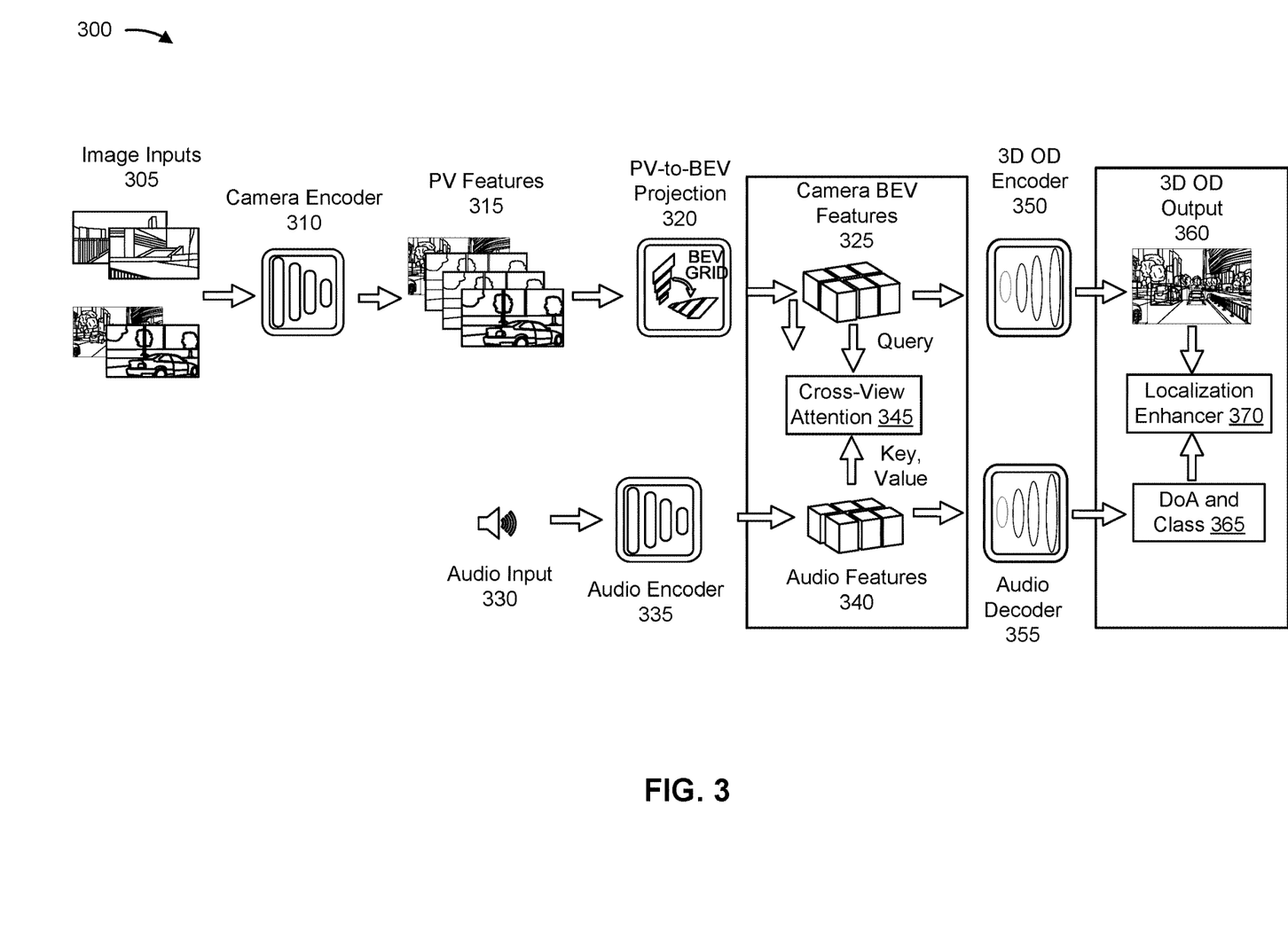
FIG. 3 is a diagram illustrating an example of object detection using image and audio data, in accordance with the present disclosure.

FIG. 3 is a diagram illustrating an example 300 of object detection using image and audio data, in accordance with the present disclosure. In some aspects, the example 300 may be performed by the UE 120 and/or by a component of the UE 120. For example, one or more steps shown in the example 300 may be performed by a vehicle, such as an automobile. In some other aspects, the example 300 may be performed by another device capable of performing object detection.

As shown by reference number 305, the UE 120 may obtain image data such as one or more image inputs. The UE 120 may obtain the image data via an image component, such as a camera, associated with the UE 120. The image component may include a single camera or may include multiple cameras. In some aspects, the UE 120 may instruct the camera to capture images in accordance with certain conditions. For example, the UE 120 may instruct the camera to capture rear-view images in accordance with a vehicle being in reverse, or to capture side-view images in accordance with a turn signal of the vehicle being on. Additionally, or alternatively, the camera may be configured to capture images periodically (e.g., in accordance with an interval). In some aspects, the image data may include video data.

As shown by reference number 310, a camera encoder (e.g., an image encoder) associated with the UE 120 may encode the image data. The camera encoder may encode the image data by converting the image into a compressed or feature-rich representation of the image. For example, the camera encoder may encode a high-dimensional image to generate a low-dimensional representation of the image that captures essential information of the image. The camera encoder may be, for example, a transform-based encoder or a neural-network-based encoder, among other examples.

As shown by reference number 315, the UE 120 may determine one or more perspective-view (PV) features of the image based at least in part on the output of the camera encoder. The PV features may indicate a geographic arrangement and/or spatial relationship between one or more objects included within the image from a particular viewpoint (e.g., from the viewpoint of the camera). In some aspects, the PV features may indicate a position, a size, and/or an orientation of the one or more objects included within the image.

As shown by reference number 320, the UE 120 may generate a bird's-eye view (BEV) projection of the image data. For example, the UE 120 may convert the PV features to BEV features using a PV-to-BEV projection. The PV-to-BEV projection may include projecting the PV features to BEV features, where the BEV features are represented by a top-down view.

As shown by reference number 325, the UE 120 may identify one or more camera BEV features. For example, the UE 120 may extract the one or more camera BEV features from the PV-to-BEV projection. The camera BEV features may correspond, for example, to one or more features of the one or more objects from the BEV perspective. For example, the camera BEV features may indicate a location of the one or more objects (e.g., relative to the UE 120) from the BEV perspective. Additionally, or alternatively, the camera BEV features may indicate a position, a size, and/or an orientation of the objects from the BEV perspective. In some aspects, the camera BEV features may include a query. The query may be (or may include) a feature map that is based at least in part on the image data.

As shown by reference number 330, the UE 120 may obtain an audio input. The UE 120 may obtain the audio input via an audio component, such as a microphone, associated with the UE 120. In some aspects, the UE 120 may instruct the microphone to capture the audio in accordance with certain conditions. Additionally, or alternatively, the audio component may be configured to capture the audio periodically (e.g., in accordance with an interval). The microphone may be a single microphone, may be multiple microphones, or may be a microphone array.

As shown by reference number 335, an audio encoder may encode the audio input. In some aspects, the audio encoder may encode the audio input by converting the audio into a compressed or encoded representation of the audio. This may reduce an amount of data that is required to store or transmit the audio while maintaining an acceptable level of audio quality. In some aspects, the audio encoder, to encode the audio input, may be configured to sample the audio input, quantize the audio input, and/or compress the audio input. In some aspects, the audio encoder may encode the audio input in accordance with one or more encoding parameters.

As shown by reference number 340, the UE 120 may identify one or more audio features corresponding to the audio input. For example, the UE 120 may identify the one or more audio features based at least in part on the output of the audio encoder. In some aspects, the one or more audio features may include a key and/or a value. The key may indicate a grid location associated with the audio input (e.g., a grid location that corresponds to one or more objects associated with the audio input). The value may be (or may include) a feature map associated with the audio input.

As shown by reference number 345, a cross-view attention layer may correlate the image data and the audio data. For example, the cross-view attention layer may correlate a query (associated with the image data) with a key and/or a value (associated with the audio data). The cross-view attention layer may perform a feature extraction operation to extract features from the image data and the audio data, an attention calculation operation to calculate a weight or a score that indicates an importance or a relevance of an element in the image data and the audio data, and/or an alignment and integration operation to correlate (e.g., fuse) the image data and the audio data. Additionally, the cross-view attention layer may perform downstream tasks such as image captioning, visual question answering (VQA), and/or image-test retrieval, among other examples, to further process the image data and the audio data.

As shown by reference number 350, a three-dimensional object detection decoder may generate a three-dimensional representation of the image. The three-dimensional object detection decoder may obtain image features (such as PV features and/or camera BEV features), decode the image features, and generate a three-dimensional representation of the image. The three-dimensional representation of the image may include a three-dimensional representation of the one or more objects included in the image.

As shown by reference number 355, an audio decoder may decode audio data (e.g., the audio features, such as the key and/or the value). In some aspects, the audio decoder may be a sound event localization and detection (SELD) decoder and/or may be configured to perform sound event localization and detection. The SELD decoder may detect and localize sound events in an environment and may identify information, such as a class and a spatial location, of the sound sources. The class may be, for example, a label or a category associated with the audio, such as "car horn," "train siren," or "dog barking." among other examples. The SELD decoder may be configured to perform a feature extraction operation by extracting relevant audio features from the audio data, a sound event detection operation to detect and classify the sound, a sound event localization operation to localize the audio source within the environment, and/or a post-processing operation (such as smoothing and/or filtering).

As shown by reference number 360, the UE 120 may obtain a first three-dimensional output, such as a three-dimensional object detection camera output. The first three-dimensional output may be based at least in part on the image data and/or may correspond to an output of the three-dimensional object detection decoder.

As shown by reference number 365, the UE 120 may obtain a second three-dimensional output. The second three-dimensional output may be based at least in part on the audio data and/or may correspond to an output of the SELD decoder. In some aspects, the second three-dimensional output may indicate a direction of arrival (DoA) and a class associated with the audio. The direction of arrival may indicate a direction, an angle, and/or a location from which the audio was received.

In some aspects, the first three-dimensional output and the second three-dimensional output may be represented by a plurality of coordinates. For example, the UE 120 may generate a coordinate map that includes a plurality of Cartesian coordinates, where each Cartesian coordinate corresponds to an object identified in the first three-dimensional output (associated with the image data) and/or the second three-dimensional output (associated with the audio data). As shown by reference number 370, a localization enhancer may combine data from the different sources. For example, the localization enhancer may combine first data captured by the camera and the microphone, second data captured only by the microphone, and third data captured only by the camera. Additional details regarding these features are described in connection with FIGS. 4A-4B.

In some aspects, an audio branch of the object detection system (e.g., that includes the audio component such as the microphone) may be configured to capture audio and to generate a three-dimensional output corresponding to the audio sources and their corresponding classes. The audio sources may be represented by three-dimensional Cartesian coordinates. A camera branch of the object detection system (e.g., that includes the image component such as the camera) may be configured to capture an image and to generate BEV features. The camera branch may generate a three-dimensional output using a three-dimensional object detection decoder. The camera inputs may be synchronized in time with respect to the audio. A cross-view attention layer may be configured to perform a fusion operation by utilizing camera BEV features (such as a query) and audio features (such as a key and a value). In some aspects, the cross-view attention (CA) may be calculated as follows:

$CA(A,V) = \text{softmax}(CW_q W_k^T A^T) AW_v$, where

CA is cross-value attention,

A is an audio feature,

V is an image feature, $W_q$ is a query, $W_k$ is a key, and $W_v$ is a value.

During training of the camera branch, the activations of the audio branch may be used to guide the three-dimensional object detection to better localize the objects that are sound sources. Additionally, the audio outputs may be compared against the audio guided camera branch output to locate occluded objects (e.g., objects that are not capable of being detected by the camera) that are sound sources. These outputs may be provided to subsequent modules including path planning and behavior modules.

As described herein, three-dimensional object detection systems may be unsuited to perform accurate object detection in crowded areas and/or uneven terrain, thereby leading to performance degradation. Audio processing may be used to enhance localization of objects within the environment. Fusion methods that rely on explicit annotations from the camera only may fail, since fully occluded objects that are audio sources typically do not have annotations in camera but do have sound sources. Sounds from heavy automobiles like trucks and emergency vehicles can be leveraged to improve the object detection system. For example, an audio and camera fusion framework may tap into advantages of both sensors (image and audio sensors), thereby eliminating the need for paired annotations. Additionally, the sensor outputs may be clustered for training purposes and to modify uncertainty scores. For example, an output of the camera branch may be modified (and/or the camera may be trained) in accordance with an output of the audio branch. This may improve three-dimensional object detection and may increase a likelihood that all objects within a three-dimensional environment are accurately detected.

As indicated above, FIG. 3 is provided as an example. Other examples may differ from what is described with regard to FIG. 3.

Figure 4A:
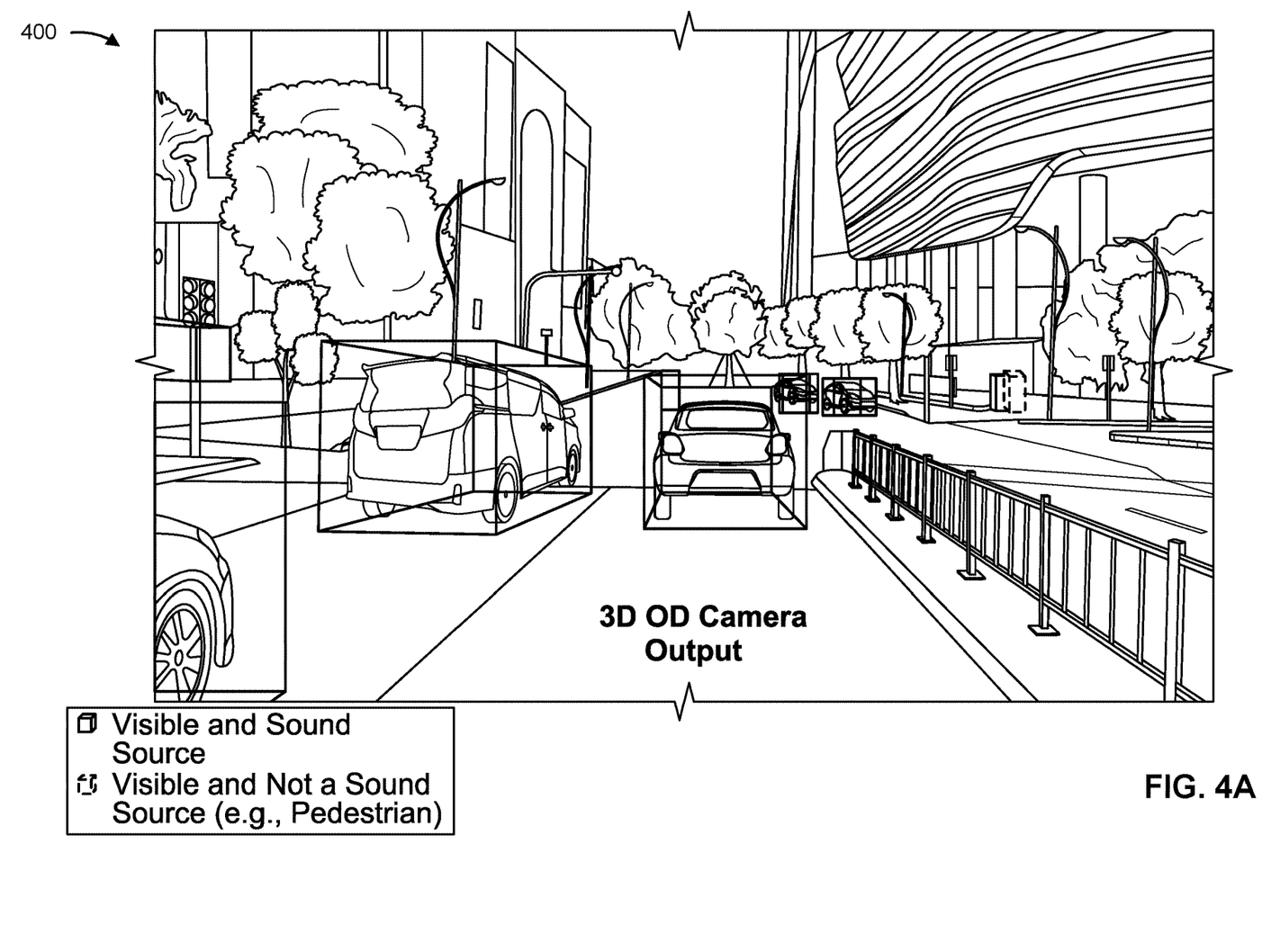
FIGS. 4A-4B are diagrams illustrating examples of localization enhancement, in accordance with the present disclosure.
Figure 4B:
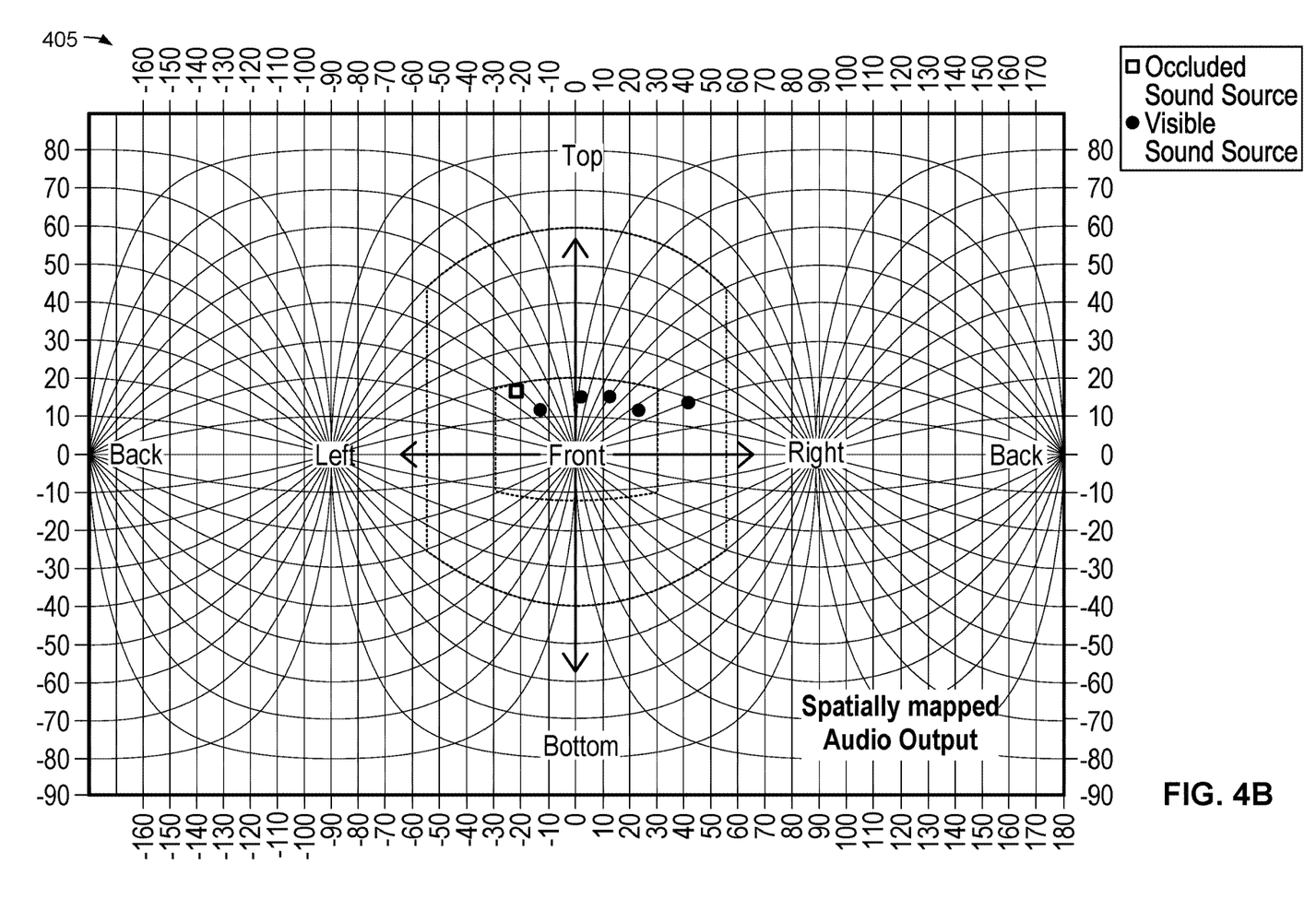

FIGS. 4A-4B are diagrams illustrating examples 400 and 405 of localization enhancement, in accordance with the present disclosure.

An object detection system, such as the object detection system described in connection with FIG. 3, may capture image data and audio data within an environment. The object detection system may correlate the image data and the audio data to improve the object detection capabilities of the system. For example, a localization enhancer may combine the image data and the audio data to improve object detection accuracy. Additionally, or alternatively, the localization enhancer may use the audio data to train an imaging component (e.g., a camera) of the object detection system to improve the object detection capabilities of the object detection system.

As shown in FIG. 4A, a camera branch associated with the object detection system may generate a first output. The first output may be a representation of objects that are capable of being detected by the camera of the object detection system. For example, the first output may include an indication of a first type of object that is detected by the camera and the audio component, such as close-range cars and pedestrians. Additionally, the first output may include an indication of a second type of object that is captured only by the camera component, such as traffic signs, construction cones, and other static objects that are not sound sources.

As shown in FIG. 4B, an audio branch associated with the object detection system may generate a second output. The second output may include spatially mapped coordinates that correspond to objects that are capable of being detected by the audio component of the object detection system. For example, the second output may include the indication of the first type of object that is detected by the camera and the audio component. Additionally, the second output may include a third type of object that is captured only by the audio component, such as objects not in the line-of-sight of the camera and long-range special vehicles.

The UE 120 (e.g., the localization enhancer) may be configured to map the objects detected by the camera and the audio component to predicted object coordinates. For example, the object detection system may use K-means clustering to map a first type of coordinate (corresponding to the first type of object), a second type of coordinate (corresponding to the second type of object), and a third type of coordinate (corresponding to the third type of object) to Cartesian coordinates (x, y, z). The localization enhancer may associate each camera prediction (e.g., as indicated by the first type of coordinate and the second type of coordinate) with a closest prediction by the audio component (e.g., as indicated by the first type of coordinate and the third type of coordinate). Any discrepancies may be passed to the downstream modules such as prediction and path planning modules (as described, for example, in FIG. 3). For occluded and non-line-of-sight objects, the audio decoder output may be passed to the downstream task modules (e.g., without associating any camera prediction).

As indicated above, FIGS. 4A-4B are provided as examples. Other examples may differ from what is described with regard to FIGS. 4A-4B.

Figure 5:
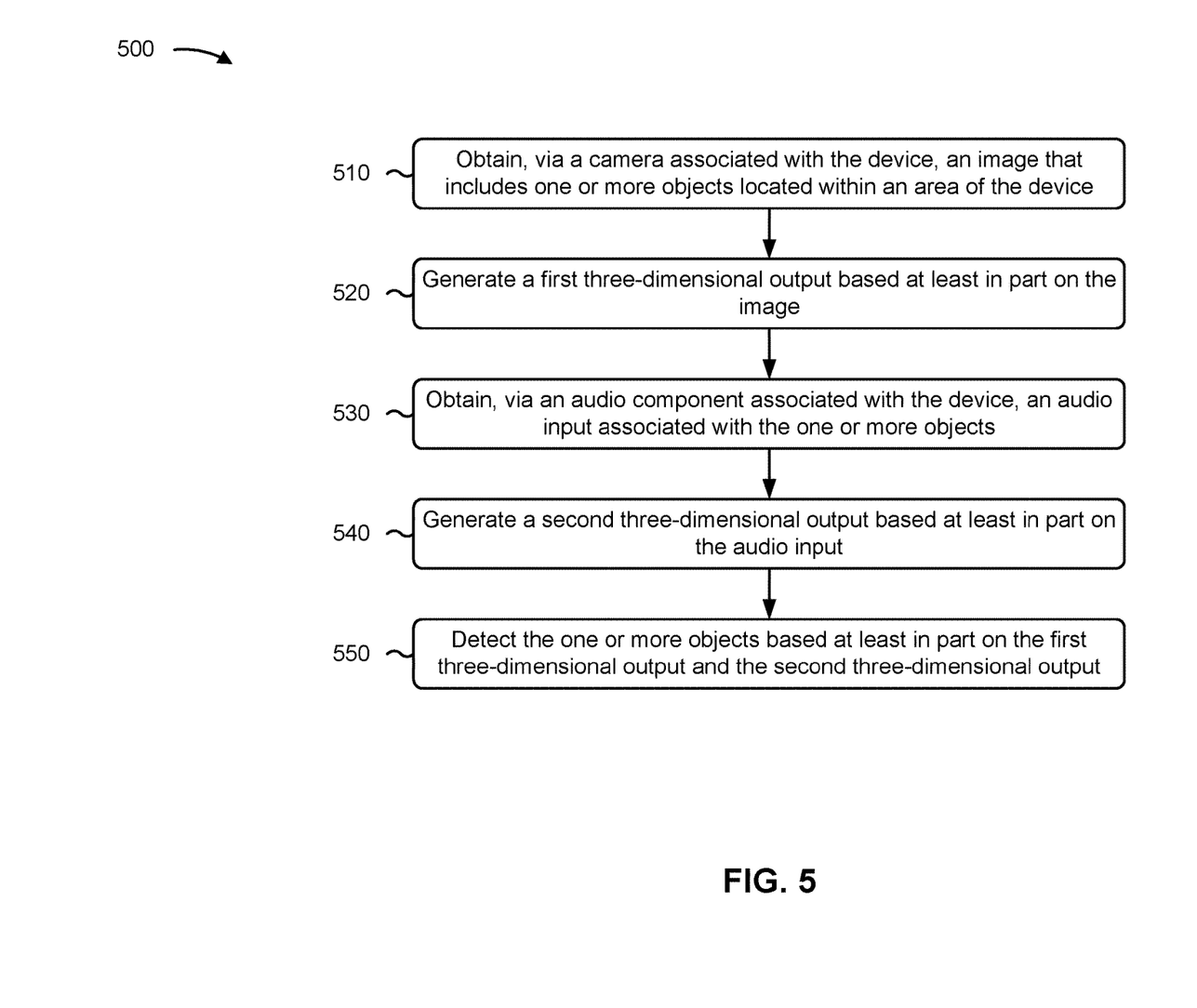
FIG. 5 is a flowchart of an example process associated with object detection using image and audio data, in accordance with the present disclosure.

FIG. 5 is a flowchart of an example process 500 associated with object detection using image and audio data, in accordance with the present disclosure. In some aspects, one or more process blocks of FIG. 5 are performed by a device (e.g., UE 120). In some aspects, one or more process blocks of FIG. 5 are performed by another device or a group of devices separate from or including the device, such as an object detection system (e.g., object detection system 130). Additionally, or alternatively, one or more process blocks of FIG. 5 may be performed by one or more components of device 200, such as processor 210, memory 215, input component 220, output component 225, communication component 230, correlation component 235, and/or object detection component 240.

As shown in FIG. 5, process 500 may include obtaining, via a camera associated with the device, an image that includes one or more objects located within an area of the device (block 510). For example, the device may obtain, via a camera associated with the device, an image that includes one or more objects located within an area of the device, as described above.

As further shown in FIG. 5, process 500 may include generating a first three-dimensional output based at least in part on the image (block 520). For example, the device may generate a first three-dimensional output based at least in part on the image, as described above.

As further shown in FIG. 5, process 500 may include obtaining, via an audio component associated with the device, an audio input associated with the one or more objects (block 530). For example, the device may obtain, via an audio component associated with the device, an audio input associated with the one or more objects, as described above.

As further shown in FIG. 5, process 500 may include generating a second three-dimensional output based at least in part on the audio input (block 540). For example, the device may generate a second three-dimensional output based at least in part on the audio input, as described above.

As further shown in FIG. 5, process 500 may include detecting the one or more objects based at least in part on the first three-dimensional output and the second three-dimensional output (block 550). For example, the device may detect the one or more objects based at least in part on the first three-dimensional output and the second three-dimensional output, as described above.

Process 500 may include additional aspects, such as any single aspect or any combination of aspects described below and/or in connection with one or more other processes described elsewhere herein.

In a first aspect, process 500 includes correlating the first three-dimensional output and the second three-dimensional output, wherein detecting the one or more objects comprises determining one or more locations of the one or more objects based at least in part on correlating the first three-dimensional output and the second three-dimensional output.

In a second aspect, alone or in combination with the first aspect, generating the second three-dimensional output comprises generating a plurality of three-dimensional Cartesian coordinates, each three-dimensional Cartesian coordinate of the plurality of three-dimensional Cartesian coordinates corresponding to an object of the one or more objects.

In a third aspect, alone or in combination with one or more of the first and second aspects, each object of the one or more objects corresponds to a sound source and a class associated with the sound source.

In a fourth aspect, alone or in combination with one or more of the first through third aspects, process 500 includes determining one or more bird's-eye view features based at least in part on the image, wherein generating the first three-dimensional output comprises generating the first three-dimensional output based at least in part on the one or more bird's-eye view features.

In a fifth aspect, alone or in combination with one or more of the first through fourth aspects, the camera is synchronized in time with respect to the audio component.

In a sixth aspect, alone or in combination with one or more of the first through fifth aspects, generating the first three-dimensional output comprises encoding the image using an image encoder, determining one or more image features based at least in part on encoding the image using the image encoder, and generating the first three-dimensional output, based at least in part on the one or more image features, using a three-dimensional object detection decoder, and generating the second three-dimensional output comprises encoding the audio input using an audio encoder, determining one or more audio features based at least in part on encoding the audio input using the audio encoder, and generating the second three-dimensional output, based at least in part on the one or more audio features, using a sound event localization and detection decoder.

In a seventh aspect, alone or in combination with one or more of the first through sixth aspects, the one or more image features include a query, and the one or more audio features include at least one of a key or a value.

In an eighth aspect, alone or in combination with one or more of the first through seventh aspects, process 500 includes performing a fusion operation between the first three-dimensional output and the second three-dimensional output.

In a ninth aspect, alone or in combination with one or more of the first through eighth aspects, the fusion operation is performed at a cross-view attention layer and uses at least one of the query, the key, or the value as an input.

In a tenth aspect, alone or in combination with one or more of the first through ninth aspects, process 500 includes performing a localization enhancement operation using the first three-dimensional output and the second three-dimensional output.

In an eleventh aspect, alone or in combination with one or more of the first through tenth aspects, process 500 includes determining at least one of a direction of arrival or a class associated with the second three-dimensional output.

In a twelfth aspect, alone or in combination with one or more of the first through eleventh aspects, process 500 includes training a three-dimensional object detection component associated with the camera using at least one of the audio input or the second three-dimensional output.

In a thirteenth aspect, alone or in combination with one or more of the first through twelfth aspects, process 500 includes comparing the second three-dimensional output with an audio-guided camera output, and determining a location of an occluded object based at least in part on comparing the second three-dimensional output with the audio-guided camera output, wherein the occluded object is associated with the audio input.

In a fourteenth aspect, alone or in combination with one or more of the first through thirteenth aspects, process 500 includes generating a coordinate map that includes a plurality of coordinates, each coordinate of the plurality of coordinates corresponding to an object of the one or more objects.

In a fifteenth aspect, alone or in combination with one or more of the first through fourteenth aspects, the plurality of coordinates includes at least one of a first type of coordinate that corresponds to an object that is detected by the camera and the audio component, a second type of coordinate that corresponds to an object that is detected only by the audio component, or a third type of coordinate that corresponds to an object that is detected only by the camera.

In a sixteenth aspect, alone or in combination with one or more of the first through fifteenth aspects, process 500 includes associating an output of an image decoder associated with the camera and an output of an audio decoder associated with the audio component, identifying one or more discrepancies between the output of the image decoder and the output of the audio decoder, and passing the one or more discrepancies to a downstream module for prediction and path planning.

In a seventeenth aspect, alone or in combination with one or more of the first through sixteenth aspects, process 500 includes passing an output of an audio decoder associated with an occluded object to a downstream module for prediction and path planning.

In an eighteenth aspect, alone or in combination with one or more of the first through seventeenth aspects, the device is an automobile, and the one or more objects correspond to other automobiles, persons, or obstacles located within the area of the automobile.

In a nineteenth aspect, alone or in combination with one or more of the first through eighteenth aspects, determining the location of the one or more objects comprises determining a distance of the one or more objects from the automobile.

Although FIG. 5 shows example blocks of process 500, in some aspects, process 500 includes additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a device, comprising: obtaining, via a camera associated with the device, an image that includes one or more objects located within an area of the device; generating a first three-dimensional output based at least in part on the image; obtaining, via an audio component associated with the device, an audio input associated with the one or more objects; generating a second three-dimensional output based at least in part on the audio input; and detecting the one or more objects based at least in part on the first three-dimensional output and the second three-dimensional output.

Aspect 2: The method of Aspect 1, further comprising correlating the first three-dimensional output and the second three-dimensional output, wherein detecting the one or more objects comprises determining one or more locations of the one or more objects based at least in part on correlating the first three-dimensional output and the second three-dimensional output.

Aspect 3: The method of any of Aspects 1-2, wherein generating the second three-dimensional output comprises generating a plurality of three-dimensional Cartesian coordinates, each three-dimensional Cartesian coordinate of the plurality of three-dimensional Cartesian coordinates corresponding to an object of the one or more objects.

Aspect 4: The method of Aspect 3, wherein each object of the one or more objects corresponds to a sound source and a class associated with the sound source.

Aspect 5: The method of any of Aspects 1-4, further comprising determining one or more bird's-eye view features based at least in part on the image, wherein generating the first three-dimensional output comprises generating the first three-dimensional output based at least in part on the one or more bird's-eye view features.

Aspect 6: The method of any of Aspects 1-5, wherein the camera is synchronized in time with respect to the audio component.

Aspect 7: The method of any of Aspects 1-6, wherein generating the first three-dimensional output comprises: encoding the image using an image encoder; determining one or more image features based at least in part on encoding the image using the image encoder; and generating the first three-dimensional output, based at least in part on the one or more image features, using a three-dimensional object detection decoder; and wherein generating the second three-dimensional output comprises: encoding the audio input using an audio encoder; determining one or more audio features based at least in part on encoding the audio input using the audio encoder; and generating the second three-dimensional output, based at least in part on the one or more audio features, using a sound event localization and detection decoder.

Aspect 8: The method of Aspect 7, wherein the one or more image features include a query, and the one or more audio features include at least one of a key or a value.

Aspect 9: The method of Aspect 8, further comprising performing a fusion operation between the first three-dimensional output and the second three-dimensional output.

Aspect 10: The method of Aspect 9, wherein the fusion operation is performed at a cross-view attention layer and uses at least one of the query, the key, or the value as an input.

Aspect 11: The method of Aspect 7, further comprising performing a localization enhancement operation using the first three-dimensional output and the second three-dimensional output.

Aspect 12: The method of any of Aspects 1-11, further comprising determining at least one of a direction of arrival or a class associated with the second three-dimensional output.

Aspect 13: The method of any of Aspects 1-12, further comprising training a three-dimensional object detection component associated with the camera using at least one of the audio input or the second three-dimensional output.

Aspect 14: The method of any of Aspects 1-13, further comprising: comparing the second three-dimensional output with an audio-guided camera output; and determining a location of an occluded object based at least in part on comparing the second three-dimensional output with the audio-guided camera output, wherein the occluded object is associated with the audio input.

Aspect 15: The method of any of Aspects 1-14, further comprising generating a coordinate map that includes a plurality of coordinates, each coordinate of the plurality of coordinates corresponding to an object of the one or more objects.

Aspect 16: The method of Aspect 15, wherein the plurality of coordinates includes at least one of a first type of coordinate that corresponds to an object that is detected by the camera and the audio component, a second type of coordinate that corresponds to an object that is detected only by the audio component, or a third type of coordinate that corresponds to an object that is detected only by the camera.

Aspect 17: The method of Aspect 15, further comprising: associating an output of an image decoder associated with the camera and an output of an audio decoder associated with the audio component; identifying one or more discrepancies between the output of the image decoder and the output of the audio decoder; and passing the one or more discrepancies to a downstream module for prediction and path planning.

Aspect 18: The method of Aspect 15, further comprising passing an output of an audio decoder associated with an occluded object to a downstream module for prediction and path planning.

Aspect 19: The method of any of Aspects 1-18, wherein the device is an automobile, and the one or more objects correspond to other automobiles, persons, or obstacles located within the area of the automobile.

Aspect 20: The method of Aspect 19, wherein determining the location of the one or more objects comprises determining a distance of the one or more objects from the automobile.

Aspect 21: A device for wireless communication, comprising: one or more memories; and one or more processors, coupled to the one or more memories, configured to: obtain, via a camera associated with the device, an image that includes one or more objects located within an area of the device; generate a first three-dimensional output based at least in part on the image; obtain, via an audio component associated with the device, an audio input associated with the one or more objects; generate a second three-dimensional output based at least in part on the audio input; and detect the one or more objects based at least in part on the first three-dimensional output and the second three-dimensional output.

Aspect 22: A non-transitory computer-readable medium storing a set of instructions for wireless communication, the set of instructions comprising: one or more instructions that, when executed by one or more processors of a device, cause the device to: obtain, via a camera associated with the device, an image that includes one or more objects located within an area of the device; generate a first three-dimensional output based at least in part on the image; obtain, via an audio component associated with the device, an audio input associated with the one or more objects; generate a second three-dimensional output based at least in part on the audio input; and detect the one or more objects based at least in part on the first three-dimensional output and the second three-dimensional output.

Aspect 23: An apparatus for wireless communication, comprising: means for obtaining, via a camera associated with the apparatus, an image that includes one or more objects located within an area of the apparatus; means for generating a first three-dimensional output based at least in part on the image; means for obtaining, via an audio component associated with the apparatus, an audio input associated with the one or more objects; means for generating a second three-dimensional output based at least in part on the audio input; and means for detecting the one or more objects based at least in part on the first three-dimensional output and the second three-dimensional output.

Aspect 24: A system configured to perform one or more operations recited in one or more of Aspects 1-23.

Aspect 25: An apparatus comprising means for performing one or more operations recited in one or more of Aspects 1-23.

Aspect 26: A non-transitory computer-readable medium storing a set of instructions, the set of instructions comprising one or more instructions that, when executed by a device, cause the device to perform one or more operations recited in one or more of Aspects 1-23.

Aspect 27: A computer program product comprising instructions or code for executing one or more operations recited in one or more of Aspects 1-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device for wireless communication, comprising:
   one or more memories; and
   one or more processors, coupled to the one or more memories, configured to:
      obtain, via a camera associated with the device, an image that includes one or more objects located within an area of the device;
      generate a first three-dimensional output based at least in part on the image;
      obtain, via an audio component associated with the device, an audio input associated with the one or more objects;
      generate a second three-dimensional output based at least in part on the audio input;

detect the one or more objects based at least in part on the first three-dimensional output and the second three-dimensional output; and correlate the first three-dimensional output and the second three-dimensional output, wherein the one or more processors, to detect the one or more objects, are configured to determine one or more locations of the one or more objects based at least in part on correlating the first three-dimensional output and the second three-dimensional output.

2. The device of claim 1, wherein the one or more processors, to generate the second three-dimensional output, are configured to generate a plurality of three-dimensional Cartesian coordinates, each three-dimensional Cartesian coordinate of the plurality of three-dimensional Cartesian coordinates corresponding to an object of the one or more objects.

3. The device of claim 2, wherein each object of the one or more objects corresponds to a sound source and a class associated with the sound source.

4. The device of claim 1, wherein the one or more processors are further configured to determine one or more bird's-eye view features based at least in part on the image, wherein the one or more processors, to generate the first three-dimensional output, are configured to generate the first three-dimensional output based at least in part on the one or more bird's-eye view features.

5. The device of claim 1, wherein the camera is synchronized in time with respect to the audio component.

6. The device of claim 1,
wherein the one or more processors, to generate the first three-dimensional output, are configured to:
encode the image using an image encoder;
determine one or more image features based at least in part on encoding the image using the image encoder; and
generate the first three-dimensional output, based at least in part on the one or more image features, using a three-dimensional object detection decoder; and
wherein the one or more processors, to generate the second three-dimensional output, are configured to:
encode the audio input using an audio encoder;
determine one or more audio features based at least in part on encoding the audio input using the audio encoder; and
generate the second three-dimensional output, based at least in part on the one or more audio features, using a sound event localization and detection decoder.

7. The device of claim 6, wherein the one or more image features include a query, and the one or more audio features include at least one of a key or a value.

8. The device of claim 7, wherein the one or more processors are further configured to perform a fusion operation between the first three-dimensional output and the second three-dimensional output.

9. The device of claim 8, wherein the fusion operation is performed at a cross-view attention layer and uses at least one of the query, the key, or the value as an input.

10. The device of claim 6, wherein the one or more processors are further configured to perform a localization enhancement operation using the first three-dimensional output and the second three-dimensional output.

11. The device of claim 1, wherein the one or more processors are further configured to determine at least one of a direction of arrival or a class associated with the second three-dimensional output.

12. The device of claim 1, wherein the one or more processors are further configured to train a three-dimensional object detection component associated with the camera using at least one of the audio input or the second three-dimensional output.

13. The device of claim 1, wherein the one or more processors are further configured to:
compare the second three-dimensional output with an audio-guided camera output; and
determine a location of an occluded object based at least in part on comparing the second three-dimensional output with the audio-guided camera output, wherein the occluded object is associated with the audio input.

14. The device of claim 1, wherein the one or more processors are further configured to generate a coordinate map that includes a plurality of coordinates, each coordinate of the plurality of coordinates corresponding to an object of the one or more objects.

15. The device of claim 14, wherein the plurality of coordinates includes at least one of a first type of coordinate that corresponds to an object that is detected by the camera and the audio component, a second type of coordinate that corresponds to an object that is detected only by the audio component, or a third type of coordinate that corresponds to an object that is detected only by the camera.

16. The device of claim 14, wherein the one or more processors are further configured to:
associate an output of an image decoder associated with the camera and an output of an audio decoder associated with the audio component;
identify one or more discrepancies between the output of the image decoder and the output of the audio decoder; and
pass the one or more discrepancies to a downstream module for prediction and path planning.

17. The device of claim 14, wherein the one or more processors are further configured to pass an output of an audio decoder associated with an occluded object to a downstream module for prediction and path planning.

18. The device of claim 1, wherein the device is an automobile, and the one or more objects correspond to other automobiles, persons, or obstacles located within the area of the automobile.

19. The device of claim 18, wherein the one or more processors, to determine the one or more locations of the one or more objects, are configured to determine one or more distances of the one or more objects from the automobile.

20. A method of wireless communication performed by a device, comprising:
obtaining, via a camera associated with the device, an image that includes one or more objects located within an area of the device;
generating a first three-dimensional output based at least in part on the image;
obtaining, via an audio component associated with the device, an audio input associated with the one or more objects;
generating a second three-dimensional output based at least in part on the audio input;
detecting the one or more objects based at least in part on the first three-dimensional output and the second three-dimensional output; and
correlating the first three-dimensional output and the second three-dimensional output, wherein detecting the one or more objects comprises determining one or more locations of the one or more objects based at least in part on correlating the first three-dimensional output and the second three-dimensional output.

21. The method of claim 20, wherein generating the second three-dimensional output comprises generating a plurality of three-dimensional Cartesian coordinates, each three-dimensional Cartesian coordinate of the plurality of three-dimensional Cartesian coordinates corresponding to an object of the one or more objects.

22. The method of claim 20, further comprising determining one or more bird's-eye view features based at least in part on the image, wherein generating the first three-dimensional output comprises generating the first three-dimensional output based at least in part on the one or more bird's-eye view features.

23. The method of claim 20,
wherein generating the first three-dimensional output comprises:
encoding the image using an image encoder;
determining one or more image features based at least in part on encoding the image using the image encoder; and
generating the first three-dimensional output, based at least in part on the one or more image features, using a three-dimensional object detection decoder; and
wherein generating the second three-dimensional output comprises:
encoding the audio input using an audio encoder;
determining one or more audio features based at least in part on encoding the audio input using the audio encoder; and
generating the second three-dimensional output, based at least in part on the one or more audio features, using a sound event localization and detection decoder.

24. The method of claim 23, wherein the one or more image features include a query, and the one or more audio features include at least one of a key or a value.

25. The method of claim 23, further comprising performing a localization enhancement operation using the first three-dimensional output and the second three-dimensional output.

26. The method of claim 20, further comprising training a three-dimensional object detection component associated with the camera using at least one of the audio input or the second three-dimensional output.

27. A non-transitory computer-readable medium storing a set of instructions for wireless communication, the set of instructions comprising:
one or more instructions that, when executed by one or more processors of a device, cause the device to:
obtain, via a camera associated with the device, an image that includes one or more objects located within an area of the device;
generate a first three-dimensional output based at least in part on the image;
obtain, via an audio component associated with the device, an audio input associated with the one or more objects;
generate a second three-dimensional output based at least in part on the audio input;
detect the one or more objects based at least in part on the first three-dimensional output and the second three-dimensional output;
correlate the first three-dimensional output and the second three-dimensional output; and
detect the one or more objects by determining one or more locations of the one or more objects based at least in part on correlating the first three-dimensional output and the second three-dimensional output.

28. An apparatus for wireless communication, comprising:
means for obtaining, via a camera associated with the apparatus, an image that includes one or more objects located within an area of the apparatus;
means for generating a first three-dimensional output based at least in part on the image;
means for obtaining, via an audio component associated with the apparatus, an audio input associated with the one or more objects;
means for generating a second three-dimensional output based at least in part on the audio input;
means for detecting the one or more objects based at least in part on the first three-dimensional output and the second three-dimensional output; and
means for correlating the first three-dimensional output and the second three-dimensional output, wherein the means for detecting the one or more objects comprises means for determining one or more locations of the one or more objects based at least in part on a correlation of the first three-dimensional output and the second three-dimensional output.

* * * * *